3,263,845
WINCH SYSTEM FOR BOAT TRAILER
Milton Davidson, 3735 W. Fullerton Ave., Chicago, Ill.
Filed Nov. 23, 1964, Ser. No. 413,133
8 Claims. (Cl. 214—516)

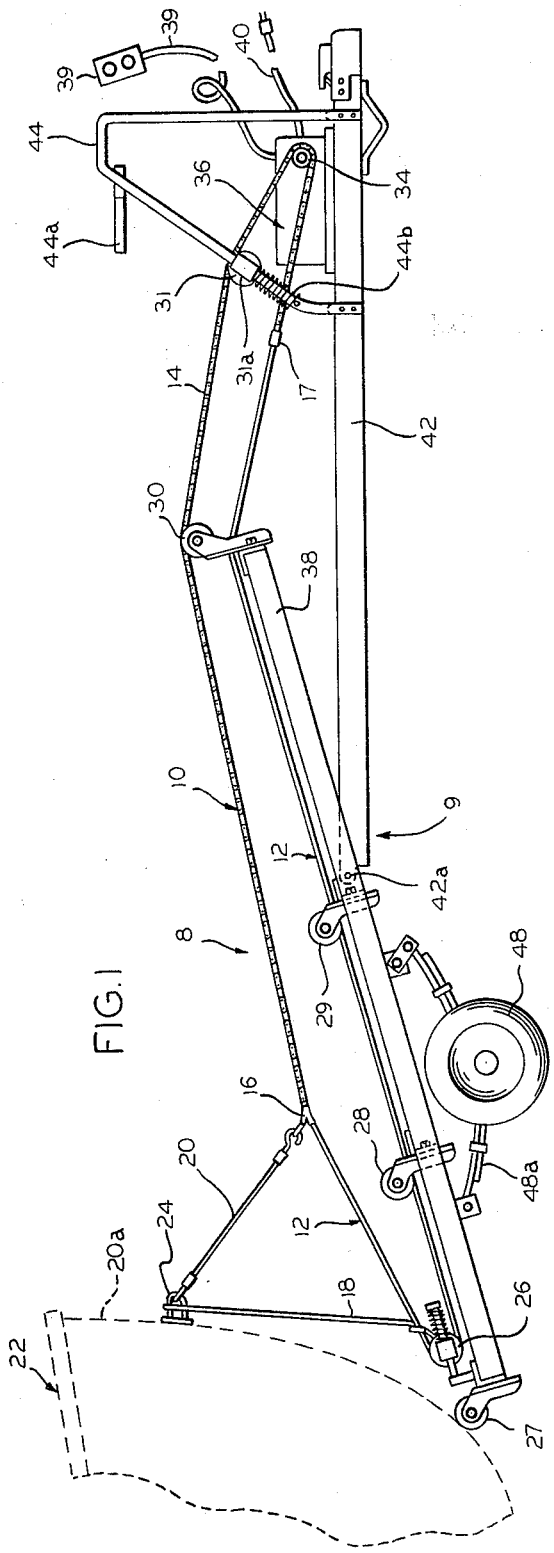

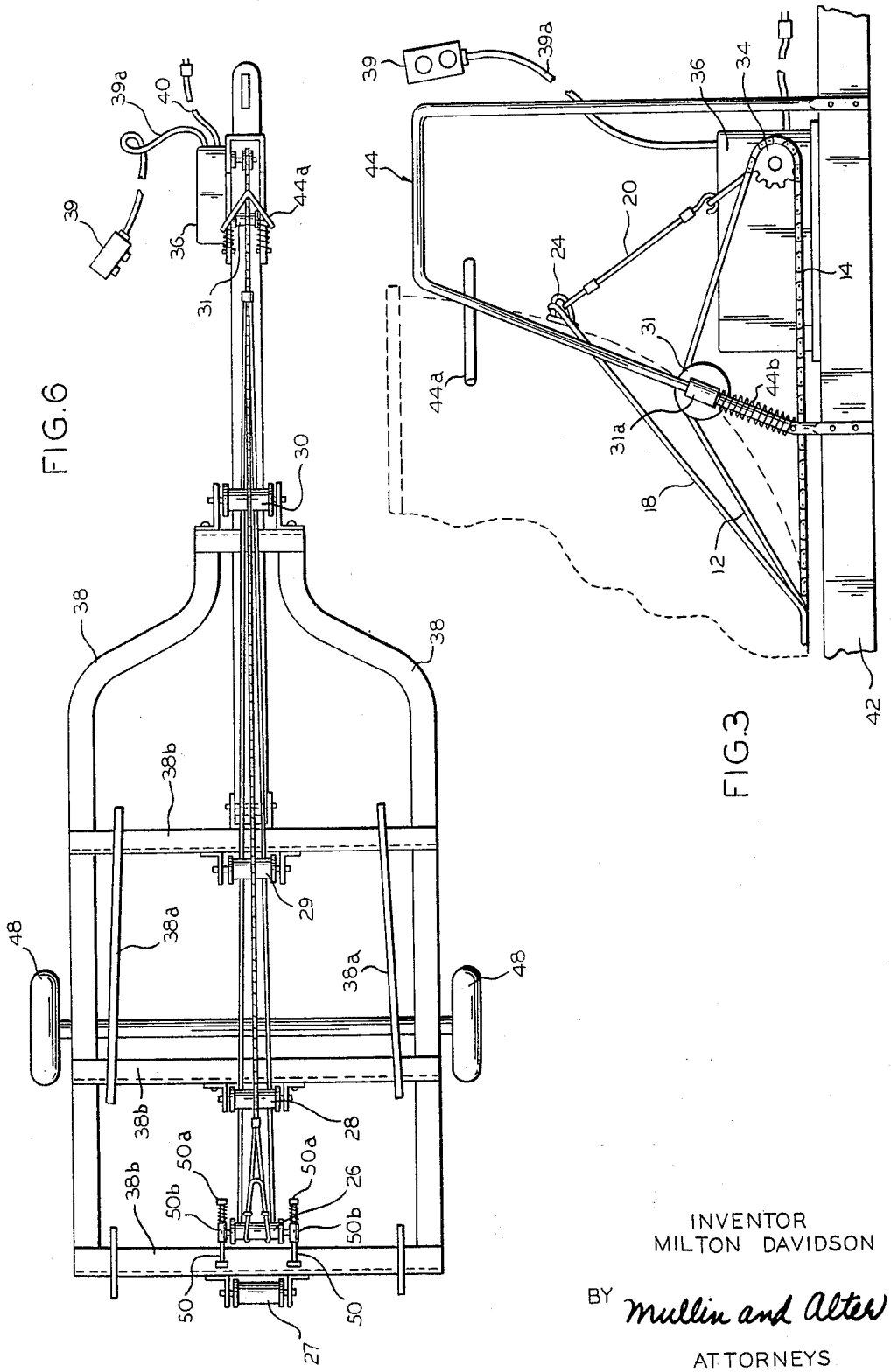

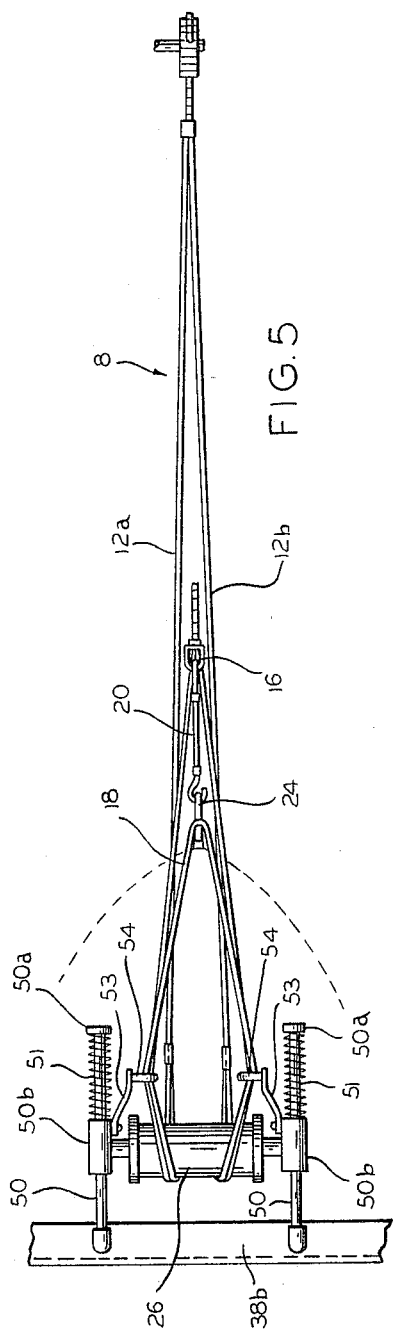
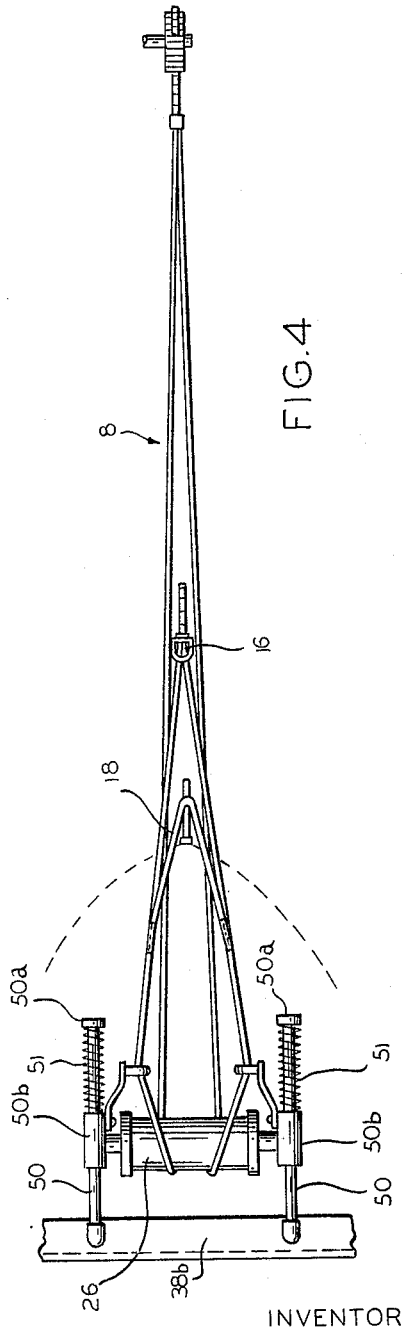

This invention relates generally to an attachment for boat trailers and more particularly to a winch system adapted for use on a boat trailer or the like wherein it is desired to launch and retrieve a boat with respect to water.

The sport of boating has grown to such magnitude that a majority of boaters must have trailers to transport their boats to and from the waters in order to engage in the sport. Once the trailers transport the boats to the water, the boaters then face the problem of unloading or disengaging the boat from the boat trailer and launching the boat into the water. In my past experience with boating and trailers, I have found it extremely difficult to disengage or launch a boat from a trailer because surprisingly, there are no winch systems or other devices which *positively* accomplish this job with the benefit of leverage. Until I developed my winch device, I was faced with the necessity of manually sliding the boat off of the boat trailer into the water without the benefit of leverage. Thus, while boat trailers are usually equipped with winch systems for lifting a boat out of the water, there were no known devices that I could use for positively launching or disengaging a boat from its boat trailer once I towed the boat trailer with the boat thereon down to a waterfront.

Another problem which I faced was controlling the rapidity with which the boat was eased into the water. Under present systems, I know of no winch system that provides the type of control needed for launching a boat in a controlled manner, viz., in accordance with a desired speed for doing same. Thus, there is a need for a winch system which can "control launch" a boat in accordance with a desired or optimum speed for lowering said boat into the water.

Another problem involved with launching a boat from a boat trailer was that the operator of the boat actually had to first lower the boat into the water, disengage the boat from the boat trailer, and *then* climb aboard. There is no way of remotely operating a winch system to launch a boat in a controlled manner while the operator is sitting in the boat.

In order to solve some of the problems involved with prior and present devices as above recited, I have provided a boat winch system in combination with a boat trailer, which can be remotely controlled preselectively and which enables a boat to be loaded thereon or disengaged therefrom positively with the aid of leverage.

It is therefore a primary object of this invention to provide a new and improved winch system for a boat trailer.

It is further an object of this invention to provide a winch system which can both lift a boat from the water onto a boat trailer or positively disengage a boat from a boat trailer to launch the same.

It is still further an object of this invention to provide a remotely controlled winch system in combination with a boat trailer which positively disengages a boat loaded on said boat trailer therefrom, in order that said boat is dropped into the water in a controlled manner.

It is even still further an object of this invention to provide a new and improved winch system for boats which can be remotely controlled while the operator thereof is in the boat to disengage a boat from a trailer or lift a boat out of the water with said winch system to place said boat on a trailer.

Other and further objects of this invention will become more readily apparent as the description proceeds and it is read in conjunction with the drawing in which:

FIG. 1 is a side elevational view of my new and improved winch system associated with a boat trailer;

FIG. 2 is an enlarged isometric view of a portion of my winch system illustrating the sling and bridle portion thereof;

FIG. 3 is a side elevational view of my winch system engaging the end of the boat after said boat has been loaded on the trailer;

FIG. 4 is a top view of my winch system engaging the front ends of the boat as the boat is being "free launched" from the boat trailer;

FIG. 5 is a top view of my winch system engaging the front end of the boat as the boat is being "control launched" by my winch system; and FIG. 6 is a top view of the boat trailer illustrating how my winch system is associated therewith.

Referring to the drawings, wherein like characters of reference indicate corresponding parts throughout, my improved winch system 8 is illustrated in combination with a boat trailer 9; and as seen from FIG. 1, the winch system is associated with the end of a boat 22 (in this case, bow 22a) initially disposed on the trailer 9 when the boat is to be loaded on said trailer. The boat trailer 9 includes a frame 38 having roller means 27, 28, 29, and 30 mounted thereon and being disposed to receive the keel or bottom of the boat along the center of the frame 38 when the boat is loaded on the boat trailer 9.

The improved winch system 8 includes a continuous rotating means 10 journalled at each end thereof and extending longitudinally along the center of the boat trailer 9. The continuous rotating means 10 has a sling portion 12 and a chain portion 14. The sling portion includes two flexible cables 12a, 12b, with each of their ends meeting together in junctures 16, 17 at opposite ends of the sling portion 12. Each of the junctures 16, 17 are connected with one end of the chain 14 to form the continuous rotating means 10.

A bridle means 18 has each of its ends 18a, 18b associated with a different one of the flexible cable portions 12a, 12b. As seen from FIGS. 4 and 5, the bridle 18 has a length that enables it to extend around the bow 20a of the boat 22. Also, the bridle means 18 is disposed along the sling portion 12 to receive the bow of the boat when the boat is initially engaged by my winch system, as illustrated in FIG. 1. Thus, to engage the boat, the bridle is initially looped around an extending portion from the bow of the boat 22, such as an eye 24, to bring the bridle means 18 into engagement with both sides of the bow portion of the boat as illustrated in FIG. 3.

One of the journalling means for the continuous rotating means 10 is the rear idler 26, which is associated with the rear portion of the boat trailer at the center thereof by means of a pair of parallel bars 50 extending from the rear cross bar 38b of the frame 38. It will be seen that the parallel bars 50 have biasing means such as springs 51 interposed between the caps 50a of the parallel bars and the rear idler axle retaining means 50b which are slidably associated with said parallel bars. Thus, the rear idler can be biased in a rearward direction and it can absorb impact thereon in the same manner as a shock absorber. Grommet bars 53 extend from each of the idler retaining means 50b to support the grommets 54. From FIG. 2, it is seen that the grommets are disposed to act as a separating means for the flexible cable portions 12a, 12b, which are respectively threaded through each of the grommets 54. Thus, the continuous rotating means 10 is journalled around the rear idler 26 in a fashion that enables the flexible cable portions 12a, 12b to be separated, thereby avoiding the tendency to become entangled along with separating the flexible cable portions 12a, 12b to insure their contact with both of the longitudinal sides of the boat when the boat is brought into engagement with the winch system 8.

The front portion of the boat trailer has a trailer platform 42 pivotally associated with the frame 38 at hinge mounting 42a. A reversible motor and speed reducer 36 is attached to platform 42 and has a sprocket 34 extending therefrom to engage the chain 14 and act as a reversible driving means for the continuous rotating means to selectively rotate it in two directions. The motor and speed reducer is connected to an electrical power source in the conventional manner by the lead 40 and it is remotely controlled in a conventional manner by means of a switching box 39, which can be attached to an elongated cord 39a in order that the winching system can be controlled while the operator thereof is sitting in the boat or standing at a distance from the motor and speed reducer 36.

An upright tubular frame member 44 is attached to the platform 42 for providing a stop means 44a to engage the bow of the boat 22 after it has been loaded onto the boat trailer. Also, from FIG. 3, it is seen that the upright frame has a front idler 31 slidably associated therewith by means of a front idler axle retaining means 31a, which is biased in an upward direction by a spring means 44b associated with the upright frame as illustrated in both FIGS. 1 and 3. It will be seen from both FIGS. 1 and 3 that the front idler engages the continuous rotating means 10 and causes it to be biased in an upward direction, thereby taking up any slack in the continuous rotating means. Therefore, when the boat is in the position illustrated in FIG. 3, the front idler 31 causes the cable portions 12a, 12b of the sling portion 12 and the bridle means 18 to tightly engage the sides of the boat.

A strap means 20 extending from the juncture 16 is provided for being associated with the eye portion 24 extending from the bow of the boat 22 in order that the boat can be pulled onto the trailer and have its keel portion associated with the roller means 27, 28, 29, and 30 on the boat. Also, the strap means 20 is provided for "control launching" the boat, which will be more fully explained hereafter.

The boat trailer illustrated in combination with my improved winch system comprises the usual guides 38a attached thereto for supporting the boat upright at the sides thereof and wheels 48 are provided with shock absorbers 48a to support the trailer. The trailer platform 42 in being pivotally mounted to the frame 38 enables the boat trailer to be positioned in the inclined position shown in FIG. 1, in order that the boat can be loaded onto the boat trailer or disengaged therefrom with the aid of an incline. However, once the boat has been loaded onto the trailer, the boat trailer pivots so that the frame 38 is in line with the platform 42.

The operation of my improved winch system 8 can best be appreciated by first understanding how the boat 22 is loaded onto the boat trailer and secondly how the boat is disengaged from the boat trailer. In FIG. 1, my winch system 8 is illustrated in the position where the boat 22 is initially loaded onto the boat trailer. It is seen that the bow of the boat contacts the roller 27; and the bridle means 18 is looped over the eye of the boat. Then the strap 20 is also hooked onto the eye 24 of the boat. Whereupon, the reversible motor and speed reducer 36 can be actuated by the switch box 39 to cause the continuous rotating means 10 to rotate in a certain direction and pull the boat onto the boat trailer in the position illustrated in FIG. 3. As the boat is pulled onto the boat trailer, the flexible cable portions 12a, 12b, being separated, frictionally engage the longitudinal portions of the boat and the bridle means engages the bow of the boat as illustrated in FIG. 3. As the boat is moved forward into the position shown in FIG. 3, the front idler 31 causes the bridle means 18 to be moved upward into tight engagement with the boat.

When it is desired to launch or disengage the boat from the boat trailer, the motor and speed reducer is reversed in an opposite direction and both the sling portion and bridle, being in contact with the bow of the boat cause the boat to move toward the rear of the trailer to the positions illustrated in FIGS. 4 and 5. For purposes of describing this invention, when the boat is to be launched without the strap in engagement with the eye of the boat, we refer to the same as a "free launch" as illustrated in FIG. 4. When the boat is to be "control launched," the strap engages the eye of the boat as depicted in FIG. 5. Thus, when the bridle and sling force the boat to the point where they are proximately disposed with relation to the rear idler, the boat is caused to be disengaged from the boat trailer.

The remote control switch in having a cord of extended length enables the operator to sit in the boat and selectively control the motor while the boat is being lowered or disengaged from the boat trailer or loaded onto the boat trailer.

Thus, it will be seen that I have provided a device which fulfills the objects of my invention in a remarkably unexpected fashion. The new and improved winch system, in having a bridle means and sliding portion combined with a reversible motor, can positively launch or disengage a boat from a boat trailer without requiring the operator thereof to manually push the boat off of the boat trailer. Also, in providing a long cord in combination with the reversible motor, I can actuate the reversible motor at a distance therefrom or while the operator is sitting in the boat.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

Therefore, it should be realized that even though I have illustrated my winch system in combination with a particular boat trailer, I intend my system to be applicable to all types of trailers having the same problem. Also, it should be realized that, even though my winch system works more efficiently when a motor and speed reducer is associated with the sprocket for driving the winch system, it is contemplated that my invention could operate almost as well with a manually driven sprocket. Therefore, my invention should not be limited to the motor and speed reducer.

What I claim and desire to secure by Letters Patent of the United States is:

1. A boat winch system embodied in a boat trailer including a frame with roller means mounted along the longitudinal center thereof and being disposed to receive the keel of a boat thereon, comprising: a continuous rotating means, said continuous rotating means having a sling portion and a chain portion, reversible driving means engaging said chain portion to cause said continuous rotating means to selectably rotate in opposite directions, said sling portion including two flexible cable portions with each of their ends meeting together in junctures at opposite ends of said sling, one of said junctures being connected to one end of said chain and the other of said junctures being connected to the other end of said chain to form said continuous rotating means, a bridle attached to said cable portions by having each end thereof associated with a different one of said cable portions, said bridle means having a length that enables it to extend around the bow of said boat, said bridle means being disposed to receive the bow of said boat when said boat is engaged by said winch system, and strap means associated with said rotating means to be attached to said bow of said boat in order that the keel of said boat can be pulled onto said rollers of said boat trailer and each side thereof brought into engagement with one of said cable portions of said sling when said continuous rotating means is actuated in a certain direction, whereby actuating said continuous rotating means in an opposite direction from said certain direction can launch said boat by having said bridle means and sling portion frictionally engage said boat and cause it to be moved off of said boat trailer.

2. A boat winch system, as defined in claim 1, wherein means for separating said cables of said sling portion are provided in order to insure contact of said cables of said sling with both of said longitudinal sides of said boat when said boat is brought into engagement with said winch system.

3. A boat winch system, as defined in claim 2, wherein a rear idler is disposed at the rear end of said boat trailer where said bow of said boat initially contacts said trailer, said rear idler acting as a journalling means for said continuous rotating means, said separating means being associated with said rear idler to keep said cables of said slings separated when they move around said rear idler.

4. A boat winch system, as defined in claim 3, wherein said separating means includes a pair of grommets proximately disposed with relation to said rear idler, each of said grommets being disposed near one side of said rear idler and having one of said cables of said sling passing therethrough in order that said cables of said sling portion are separated from each other.

5. A boat winch system, as defined in claim 4, wherein a pair of parallel bars extend from the rear of said trailer, a pair of rear idler axle retaining means slidably associated with said parallel bars, each of said rear idler axle retaining means rotatably journalling said rear idler, and a pair of spring biasing means associated with each of said parallel bars and urging said rear idler rearwardly to keep said continuous rotating means taut.

6. A boat winch system, as defined in claim 5, wherein a front idler is associated with said continuous rotating means at the front end of said boat trailer, said front idler biasing said continuous rotating means to cause said bridle and said cables of said sling portion to tightly come into contact with said boat.

7. A boat winch system, as defined in claim 6, wherein said front end of said boat trailer has an upwardly extending tubular frame attached thereto, a stop means associated with said upright frame to engage said bow of said boat when said boat is completely loaded onto said boat trailer, front axle retaining means slidably associated with said tubular frame, said front idler being rotatably journalled on said front axle retaining means, and spring biasing means associated with said upwardly extending tubular frame and urging said front idler upwardly to keep said continuous rotating means taut in order that said sling portion and bridle portions can tightly engage said boat.

8. A boat winch system, as defined in claim 5, wherein said reversible driving means includes a reversible motor associated with a sprocket by way of a speed reducer, and a remote control switch attached to said reversible motor to actuate said motor in a desired direction, said remote control switch having a cord extending a considerable length from said motor whereby it can be actuated while the operator is seated in said boat.

References Cited by the Examiner
UNITED STATES PATENTS

| | | | |
|---|---|---|---|
| 2,936,915 | 5/1960 | Marsh | 214—85.1 |
| 3,088,709 | 5/1963 | Hunt | 214—85.1 X |
| 3,210,049 | 10/1965 | Holsclaw | 254—166 |

GERALD M. FORLENZA, *Primary Examiner.*

A. J. MAKAY, *Assistant Examiner.*